United States Patent Office 2,765,360
Patented Oct. 2, 1956

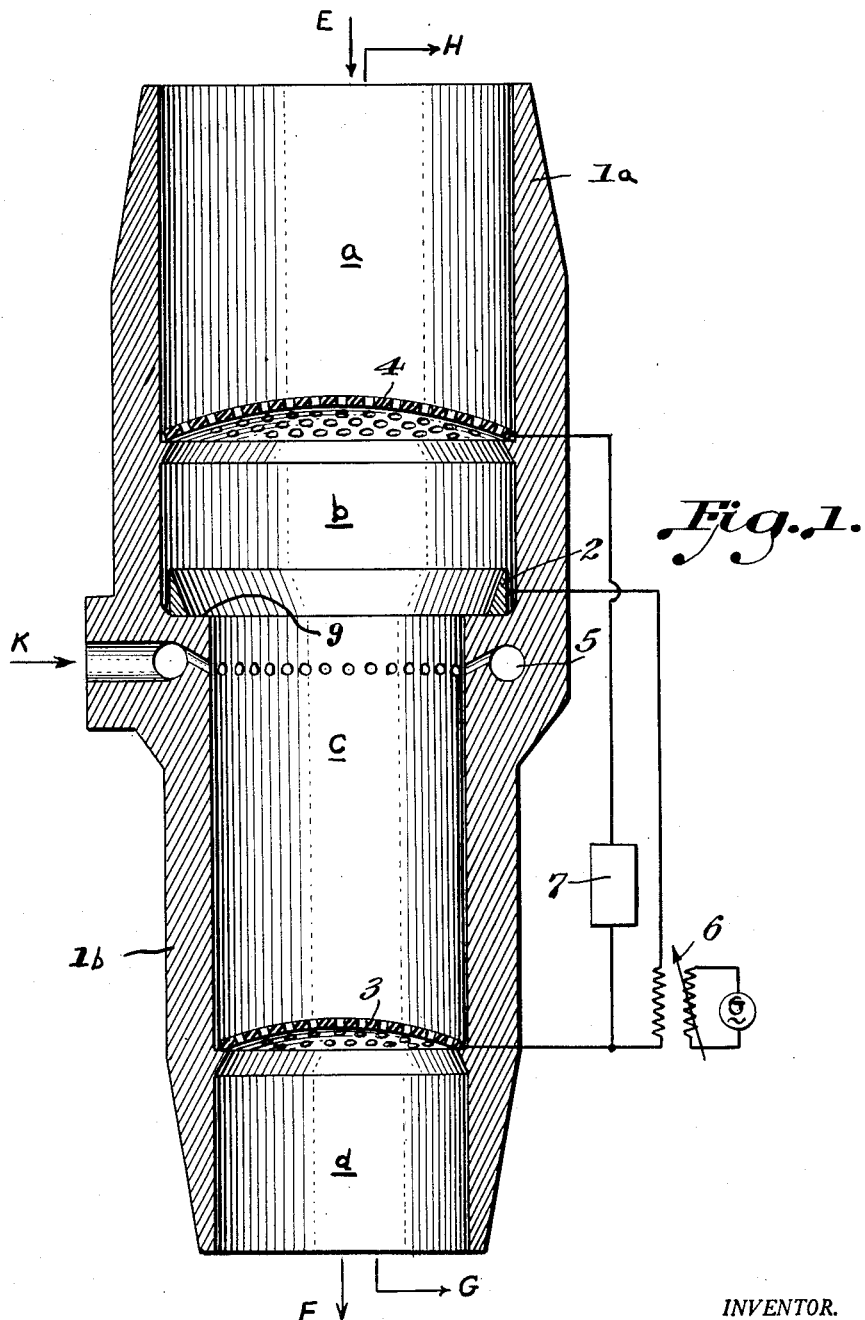

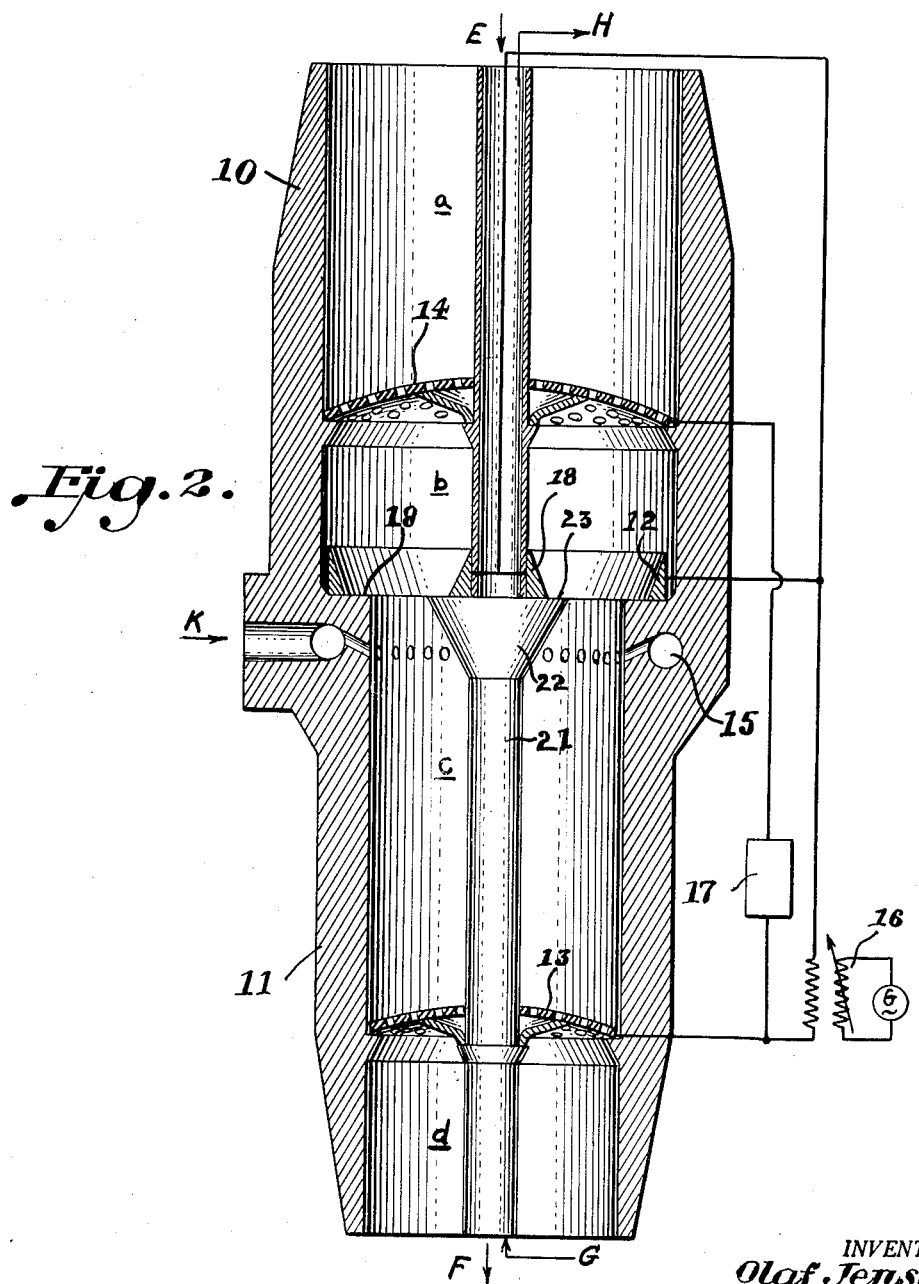

2,765,360

FURNACE FOR USE IN ENDOTHERMIC REDUCTION PROCESS

Olaf Jensen, Oslo, Norway, assignor to Norsk Hydro-Elektrisk Kvaelstofaktieselskab, Oslo, Norway Application January 31, 1955, Serial No. 485,192

Claims priority, application Norway February 2, 1954

6 Claims. (Cl. 13—23)

In dry reduction of iron ore with hydrogen or extremely hydrogenous gas, heat has to be added to the process, which involves considerable difficulty when the process is to be carried out on a large technical scale. Thus if attempt is made to supply the requisite amount of heat by a supertemperature of the reducing gas over the reaction temperature, the sponge iron so formed will be so hot that it fuses into a solid mass, or if heat is supplied through the furnace walls or by means of other heating surfaces, these will also become so hot that the sponge iron adheres to them.

Another method of furnishing the necessary heat is by electric resistance heating, in which the sponge iron produced forms the resistance material. But in this case too considerable difficulty is encountered. While the original iron ore fails to conduct or conducts very poorly the electric current, the completely reduced sponge iron possesses, for a resistance material, a relatively high conductive capacity. Thus the electric conductivity of the material changes very considerably during the reduction process. This has, however, the advantage that the heat develops most strongly there where the course of the reduction process is most rapid, and where consequently the need for heat is greatest. On the other hand the heat development in the mass which is not much reduced may become so great that the mass melts before it has been sufficiently reduced, and at the same time the temperature in those parts of the reduction furnace where the less reduced material is located because too low, by reason of deficient heat.

Thus if the reduction is to be effected in a vertical shaft furnace, where the iron ore is inserted at the top of the shaft and is conducted downwards in this countercurrently to the hydrogenous gas, and the electric energy is supplied in the form of a one-phase alternating current or direct current through two iron electrodes placed one above the other, the temperature round the upper electrode may become so high that the iron ore next to this melts and the electrode itself gets extremely corroded, even when water-cooled. At the same time the lower part of the furnace will not be so hot that the reduction process can be brought to completion at sufficient speed. If the upper electrode consists of a centrally situated vertical cylinder, the iron ore lying in the immediate vicinity of this becomes more strongly heated, and consequently more rapidly reduced, than that part of the ore which lies nearer the furnace walls. The result of this will be that in the centre of the furnace a core of ore is formed which is more reduced than the ore which moves along the furnace walls. For this reason the electric current will more readily pass through the central area of the furnace shaft, which thereby gets a complete supply of energy and consequently becomes strongly heated, while the peripheral areas will remain relatively cold. Thus in a shaft furnace with an internal diameter of 550 mm. and fitted with a cylindrical upper electrode of 200 mm. diameter a temperature of 575° C. was measured 30 mm. inside the furnace wall, while at the same time the temperature 90 mm. inside the brick wall was 850° C. As the furnace was well insulated, the difference in temperature was not due to loss of heat to the furnace wall.

It is possible to eliminate in part the said difficulties in electric resistance heating of reduction furnaces by conducting the reduced sponge iron back to the top of the furnace together with the unreduced iron ore, as indicated in my U. S. A. patent application (Serial No. 485,191, filed January 31, 1955), whereby the electric conductivity of the filled material becomes substantially greater. But this does not remove the drawbacks attached to a centrally located upper electrode, mentioned above.

The present applicant has now found that the said difficulties attaching to electric resistance heating of the sponge iron can be entirely eliminated by use of a furnace according to the invention.

Flush with the lower edge of the upper electrode the cross section of the furnace is increased to such an extent that the two parts of the furnace form at this point a broad shelf, on which the electrode, which in this case has an annular shape, can rest. The electrode is placed close up to the furnace wall and the shelf is made sufficiently wide that a part of it, inside the electrode, remains clear. Thus the electrode has obtained relatively to the lower cross section of the furnace a retracted position. When the furnace is filled with iron ore or sponge iron, some of the material adjacent to the upper electrode will rest on the clear part of the shelf formed by the brickwork of the furnace, and will consequently remain lying there. The material will therefore very soon be completely reduced, so that the upper electrode only comes into contact with good conductive material. The temperature-equalizing effect caused by the upward gas current will in some degree benefit the material nearest to the upper electrode, so that the temperature of this is able to rise so high that the pieces of sponge iron will be welded together.

Thereby the electric conductivity will be still further improved, and the heat development at this point correspondingly smaller. This in conjunction with the effect of the cooled iron electrode will prevent the sponge iron in the immediate vicinity of the electrode from melting.

The lower electrode will in this case most advantageously have the form of an open, slightly upward bent, grid, through which the sponge iron formed can pass to the cooling zone below. This electrode can also be made of iron and cooled internally by water or air.

The approximately horizontal lines of electric current emanating from the upper electrode will at the edge of the shelf mentioned above bend round in a vertical direction, and they will of course be particularly concentrated at this point. In order to counteract any overheating of the sponge iron here the fresh reducing gas can, as stated in the above-mentioned U. S. A. patent application, be introduced through a ring channel just below the upper electrode, whereby the gas velocity will be greater at this point, and thereby also the temperature-equalizing effect of the gas. This latter will also be increased by the fact that the reduction process proceeds more rapidly with the fresh gas than with that which comes from below, and which is already partially consumed. Finally it is possible of course also to effect a temperature adjustment at this critical part of the furnace by regulating the temperature of the fresh gas.

The temperature in the furnace will reach a maximum at a point level with the upper electrode (approx. 900° C.), and will decrease both upwards and downwards in the furnace. It will then be possible to utilize the heat (approx. 700–900° C.) of the upward moving gas for prior reduction of the iron ore in the area of the furnace lying between the upper electrode and the top of the furnace, where the iron ore is preheated. This prereduction may be increased still further by placing an auxiliary electrode of the same form as the lower electrode, and electrically coupled to this, at a suitable height above the upper electrode. In such degree as the conductivity of the filled material permits, a greater or less partial current will then pass from the upper electrode to the auxiliary electrode and augment the reduction effect in the shaft immediately above the upper electrode. This coupling must not be confused with the so-called Scott coupling for three-phase current (cf. Norwegian Patent No. 58,215). With the latter coupling the same difficulties would be encountered round the auxiliary electrode as have been mentioned earlier.

In the accompanying drawings:

Fig. 1 is an elevational section of a furnace according to the present invention; and Fig. 2 is an elevational section of a modification of the furnace according to the invention in which the internal diameter is larger than 2 meters.

The vertical shaft furnace shown in Fig. 1 has an upper part 1a and a lower part 1b, the upper part having an internal cross section which is larger than the internal cross section of the lower part. The furnace is lined with fireproof brick, with a layer of insulating stonework on the outside thereof. The preheating zone of the furnace is designated by the letter a, the pre-reduction zone by b, the main reduction zone by c and the cooling zone by d. Between the upper and lower parts 1a and 1b is formed a shelf 9 on which rests an upper electrode 2 having an annular shape. The annular upper electrode 2 lies adjacent the internal wall of the upper part 1a and thereby leaves a free space on the inner part of the shelf 9.

There is also provided a lower electrode 3 in the lower part 1b in the form of a grid, and an auxiliary electrode 4 in the upper part 1a above the upper electrode 2. The auxiliary electrode is also in the form of a grid.

Around the upper end of the lower part 1b is a ring shaped channel 5 having a plurality of ports extending into the upper end of the lower part 1b for the introduction of fresh gas thereto.

A single phase transformer 6 having a voltage adjustment means provides current to the electrodes 2 and 3 by means of electrical connections therebetween. Auxiliary electrode 4 is connected with the transformer 6 through a voltage regulator 7.

The furnace is fed at the top, as indicated by the arrow E, with a mixture of piece iron ore and reduced sponge iron, which is withdrawn from the bottom of the furnace (see arrow F) and conducted in part back to the furnace. Gas, consisting mainly of hydrogen and carbon oxide which contains at least 50% hydrogen, is conducted into the bottom of the furnace, as indicated by the arrow G. The gas from the top of the furnace (arrow H) is cooled and freed from its content of aqueous vapour and carbonic acid (the apparatus for this is not shown in the drawing), before being led back to the bottom of the furnace. The fresh gas, having a temperature of approximately 900° C., is introduced through an annular channel (5) in the middle of the furnace just below the upper electrode (see arrow K).

In the case of the furnaces having a diameter exceeding 2 to 3 meters a fireproof column can suitably be installed in the center of the furnace. As seen in Fig. 2, the vertical shaft furnace has an upper part 10 and a lower part 11, the upper part 10 having a larger internal cross section than the lower part. A shelf 19 is formed between the upper and lower parts 10 and 11 in the same manner as in the form shown in Fig. 1, and an upper electrode 12 having an annular shape is positioned on the shelf 19 close to the internal wall of upper part 10, thus leaving a free space on the inner edge of the shelf 19. A ring shaped channel 15 is also provided as in the form shown in Fig. 1.

A central column 21 of fireproof material is provided and has an enlargement 23 thereon forming a shelf 23 level with the shelf 19. An annular electrode 18 rests on this shelf, and may be positioned thereon so that it lies against the central column 21 to leave the outer edge of the shelf 23 free. Electrode 18 is electrically connected with electrode 12.

Lower electrode 13 is provided in the same manner as in the form shown in Fig. 1; however, in the modification of Fig. 2 the grid has an annular shape. Likewise an auxiliary electrode 14 is provided, which also has an annular shape. The electrical connections are the same as in the form shown in Fig. 1, being a transformer 16 and a voltage regulator 17.

The furnace described here can of course also with advantage be used for the reduction of other metals by means of gas, where the reduction process is endothermic and requires therefore the addition of energy.

I claim:

1. A vertical shaft furnace which is heated by electric resistance heating, for use in endothermic reduction processes for the production of metals, particularly sponge iron, in which the reduced metal forms the electric resistance material in a heated zone in the central part of the furnace between an upper and a lower electrode, comprising an upper part and a lower part, the upper part having an internal cross section larger than the internal cross section of the lower part, a shelf formed between the upper and lower parts, an upper electrode having an annular shape on said shelf lying close to the interior wall of the upper part, thereby leaving the inner part of said shelf free.

2. A vertical shaft furnace as claimed in claim 1 and a lower electrode having the form of an open grid in the lower part of said furnace.

3. A vertical shaft furnace as claimed in claim 2 and an auxiliary electrode in the upper part of the furnace above the said upper electrode, said auxiliary electrode being electrically connected to said lower electrode and having the form of an open grid.

4. A vertical shaft furnace as claimed in claim 1 having an internal diameter greater than 2 meters, and a central column of fireproof material having an enlargement thereon forming a horizontal shelf level with said shelf between the upper and lower parts of the furnace, and an annular electrode resting on said shelf serving as a second upper electrode, said annular electrode electrically connected to said upper electrode.

5. A vertical shaft furnace as claimed in claim 4 in which said annular electrode is positioned on said shelf on said column close to said column, thereby leaving the outer edge of said shelf on said column free.

6. A vertical shaft furnace as claimed in claim 4 and a lower electrode in the form of an open grid in the lower part of said furnace, and an auxiliary electrode in the form of a grid in the upper part of the furnace above the upper electrode, said auxiliary electrode electrically connected to said lower electrode.

References Cited in the file of this patent

UNITED STATES PATENTS

| 391,034 | Eames | Oct. 16, 1888 |
| 1,937,064 | Moore | Nov. 28, 1933 |

FOREIGN PATENTS

| 23,338 | Norway | May 19, 1913 |